US006629088B1

(12) United States Patent
Rising, III

(10) Patent No.: US 6,629,088 B1
(45) Date of Patent: Sep. 30, 2003

(54) METHOD AND APPARATUS FOR MEASURING THE QUALITY OF DESCRIPTORS AND DESCRIPTION SCHEMES

(75) Inventor: Hawley K. Rising, III, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 233 days.

(21) Appl. No.: 09/677,850

(22) Filed: Oct. 3, 2000

Related U.S. Application Data

(60) Provisional application No. 60/168,267, filed on Nov. 30, 1999.

(51) Int. Cl.[7] ............................................... G06F 15/18
(52) U.S. Cl. ........................... 706/12; 706/20; 706/45; 706/46
(58) Field of Search ............................ 706/45, 46, 12, 706/20

(56) References Cited

PUBLICATIONS

P. B., Kantor, et. al., "The Maximum Entrophy Principle In Information Retrieval," Proceeding of the 1986 ACM Conference on Research and Development in Information Retrieval, Sep. 1986, pp. 269–274.
J.R. Ohm, et al., "A Multi–Feature Description Scheme For Image And Video Database Retrieval," IEEE, 3rd Workshop on Multimedia Signal Processing, Sep. 1999, pp. 123–128.
A. Puri, et al., "MPEG–4: An Object–Based Multimedia Coding Standard Supporting Mobile Applications," Mobile Networks and Applications, vol. 3, Issue 1, 1998, pp. 5–32.
PCT Search Report dated May 31, 2001, 5 pages.
H. K., Rising, "Creating A Biologically Plausible Model of Recognition Which Generalizes Multidimensional Scaling," SPIE vol. 3644, Jan. 1999, pp. 411–420.
H. K., Rising, "Axiomatization of Domain Knowledge For Modeling DS," MPEG99/M5190, Melbourne, AU, Oct. 1999, 7 pages.
A. Tversky, et al., "Features of Similarity," Psychology Review, vol. 84, No. 4, Jul. 1977, pp. 327–352.
Kyle Siegrist, Dept. of Mathematical Science, University of Alabama in Huntsville, "Probability Spaces, Virtual Laboratories In Probability And Statistics," (Section 4), 12 pages.
MSI Insight II, Felix User Guide, Release Mar. 2000, Felix Command Language Reference, (Section A, Command Reference nd2), 83 pages.
International Organisation For Standardisation ISO/IEC JTC1 SC29/WG11 Coding of Moving Pictures And Audio, Geneva Switzerland, May 2000, 10 pages.
Ohm et al; A Multi–Feature Description Scheme for Image and Video Database Retrieval; Sep. 1999, IEEE; 0–7803–5610 1/99; 123–128.*

* cited by examiner

*Primary Examiner*—John Follansbee
*Assistant Examiner*—Joseph P. Hirl
(74) *Attorney, Agent, or Firm*—Blakely, Sokoloff, Taylor & Zafman LLP

(57) ABSTRACT

A method and apparatus for determining quality of a description are described. According to one embodiment, an exemplary method for determining quality of a description includes posing a classification task concerning at least one audiovisual object to a descriptive method that is used to create the description, generating a set of probabilities from a result of the classification task, and measuring an entropy of the result using the set of probabilities.

18 Claims, 6 Drawing Sheets

METHOD AND APPARATUS FOR MEASURING THE QUALITY OF DESCRIPTORS AND DESCRIPTION SCHEMES

RELATED APPLICATIONS

This application claims the benefit of U.S. Provisional Application No. 60/168,267, filed Nov. 30, 1999.

FIELD OF THE INVENTION

The present invention relates to evaluating descriptive data and more specifically to measuring the quality of descriptors and description schemes.

BACKGROUND OF THE INVENTION

The Motion Picture Expert Group (MPEG) develops standards concerning audiovisual content. One component of the MPEG standard scheme includes MPEG-7 standards which are directed to providing fast and efficient identification of audiovisual content that may be of interest to the user. Specifically, the MPEG-7 standards are developed to regulate information describing the audiovisual content. Descriptions of audiovisual content may be used in various areas, including storage and retrieval of audiovisual items from databases, broadcast media selection, tele-shopping, multimedia presentations, personalized news service on the Internet, etc. According to the MPEG-7 standards, the descriptions are organized in the form of description schemes and descriptors. A descriptor is a representation of a feature of an audiovisual object. Typically, the descriptor defines the syntax and the semantics of the feature representation. A description scheme specifies the structure and semantics of the relationships between its components, which may be either descriptors or other description schemes. Currently, no unifying measure exists to compare audio descriptors with video descriptors, i.e., an audio descriptive method cannot be compared with a text or video descriptive method. In addition, no methods exist to compare description schemes. That is, no means exists to ensure that each component of a description scheme is functioning as well as the others.

Existing methods of comparing descriptions are typically based on creating distance measures when measuring the quality of descriptions. The distance measures use ratio or metric data which carries the most knowledge about the content it describes as compared to other types of descriptive data (e.g., interval data, rank order data, categorical data, or boolean data). However, a significant number of descriptions do not possess such specific information about the content being described as needed for creating distance measures.

Another disadvantage of using metric representations of similarity is that metric representations do not match human perception of quality measures. As Amos Tversky points out in "Features of Similarity," Psychological Review, v. 84, n. 4, 1977, dimensional representations may be appropriate for certain stimuli (e.g., colors, tones) but not for others (e.g., faces, countries, or personalities). The assessment of similarity for such stimuli as faces, countries, or personalities may be better described as a comparison of features rather than as the computation of metric distance between points. When comparing sets of features, humans perceive similarity between the sets, and problems arise if a distance measure is substituted for this perception. These relationships may be described using "fuzzy set" relations. See Rising, H. K., "Creating a Biologically Plausible Model of Recognition which Generalizes Multidimensional Scaling," Rogowitz, B. and T. Pappas, eds, Proc. SPIE 3644, 1999, pp. 411–420. Fuzzy set relations refer to relations that are not symmetric. For instance, statement "a is like b" may not be equivalent to the converse similarity statement "b is like a" (e.g., a Volvo does not have the same similarity to a car as a car does to a Volvo). Accordingly, for sets of features, metric representations of similarity may not be as accurate as fuzzy set relations, which discriminate based on mutual inclusion of the sets of features.

In contrast to metric representations of similarity, classification schemes are not subject to the above problems. First, classification schemes are based on categorical data. While many forms of numeric descriptions and descriptions which exist only as membership to a group do not carry such specific knowledge about the content as the knowledge required for ratio data, they do possess categorical information sufficient for classification schemes. Further, classification or categorization tasks respect the structure of similarities based on fuzzy set relations because they respect set inclusion.

Therefore, it would be advantageous to create a universal quality measure that can use categorical data, be compliant with human perceptual similarities and be capable of comparing various descriptors, as well as description schemes.

SUMMARY OF THE INVENTION

A method and apparatus for determining quality of a description are described. According to one embodiment, an exemplary method for determining quality of a description includes posing a classification task concerning at least one audiovisual object to a descriptive method that is used to create the description, generating a set of probabilities from a result of the classification task, and measuring an entropy of the result using the set of probabilities.

BRIEF DESCRIPTION OF THE DRAWINGS

The present invention is illustrated by way of example, and not by way of limitation in the figures of the accompanying drawings in which like reference numerals refer to similar elements.

DETAILED DESCRIPTION

Figure 1:
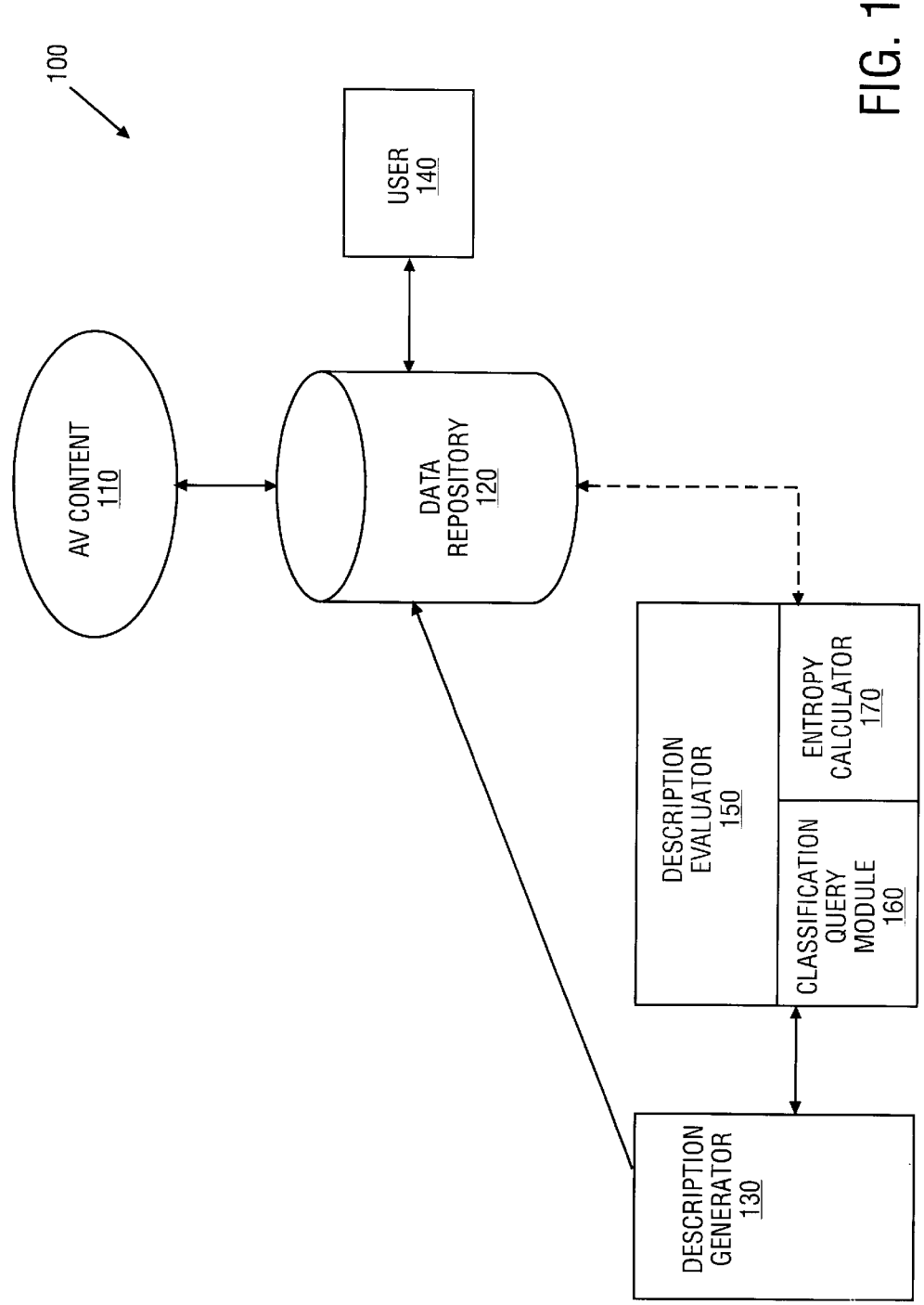
FIG. 1 is a block diagram of one embodiment of a system for maintaining a repository of descriptive data concerning audiovisual content.

A method and apparatus for determining quality of descriptions are described. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of one embodiment of system 100 for maintaining a repository of descriptive data concerning audiovisual content. System 100 includes a data repository 120 coupled to audiovisual content 110. Data repository 120 contains numerous descriptions of audiovisual content 110. When a user requests a particular piece of audiovisual content 110 by providing one or more attributes pertaining to this piece, one or more descriptions are located in data repository 120 to retrieve the requested piece of audiovisual content 110. In one embodiment, audiovisual content 110 is stored independently. Alternatively, audiovisual content may be stored together with the descriptions in data repository 120.

The descriptions include descriptors and descriptions schemes. As described above, a descriptor is a representation of a feature of an audiovisual object. Typically, the descriptor defines the syntax and the semantics of the feature representation. A description scheme specifies the structure and semantics of the relationships between its components, which may be either descriptors or other description schemes.

In one embodiment, descriptions are created by description generator 130. Description generator 130 uses various methods to create descriptions. Description evaluator 150 evaluates how well the created descriptions describe audiovisual content 110. In one embodiment, these evaluations are used to compare various descriptive methods employed by description evaluator 150 in generating descriptions. Then, the methods that create descriptions of lower quality are either discarded or improved. In another embodiment, description evaluator 150 is used to select the best descriptions from various descriptions created by description generator 130. In this embodiment, the best descriptions may then be stored in data repository 120 and other descriptions created by description generator 130 may be discarded. In yet another embodiment, description evaluator 150 is used to create the most efficient browsing structure for data repository 120. That is, when user 140 requests a piece of audiovisual content 110, descriptions are located using the browsing structure defined by description evaluator 150, rather than a search mechanism that is based on building indexes to descriptions.

In one embodiment, description evaluator 150 evaluates the quality of a description by determining how well a descriptive method, which is used to create the description, can classify the object described by the description. The classification result is evaluated by measuring its entropy, which demonstrates the amount of ambiguity left in the result. In one embodiment, description evaluator 150 includes classification query module 160 and entropy calculator 170. Classification query module 160 poses a classification task to a descriptive method used to create a description. The classification task concerns one or more audiovisual objects within audiovisual content 110. Entropy calculator 170 generates a set of probabilities from the result of the classification task and measures entropy of the result using the set of probabilities. The measured entropy defines ambiguousness (i.e., it demonstrates how uncertain the descriptive method can perform the classification task, thereby indicating whether the description created by this descriptive method is capable of unambiguously classifying an object being described).

Figure 2:
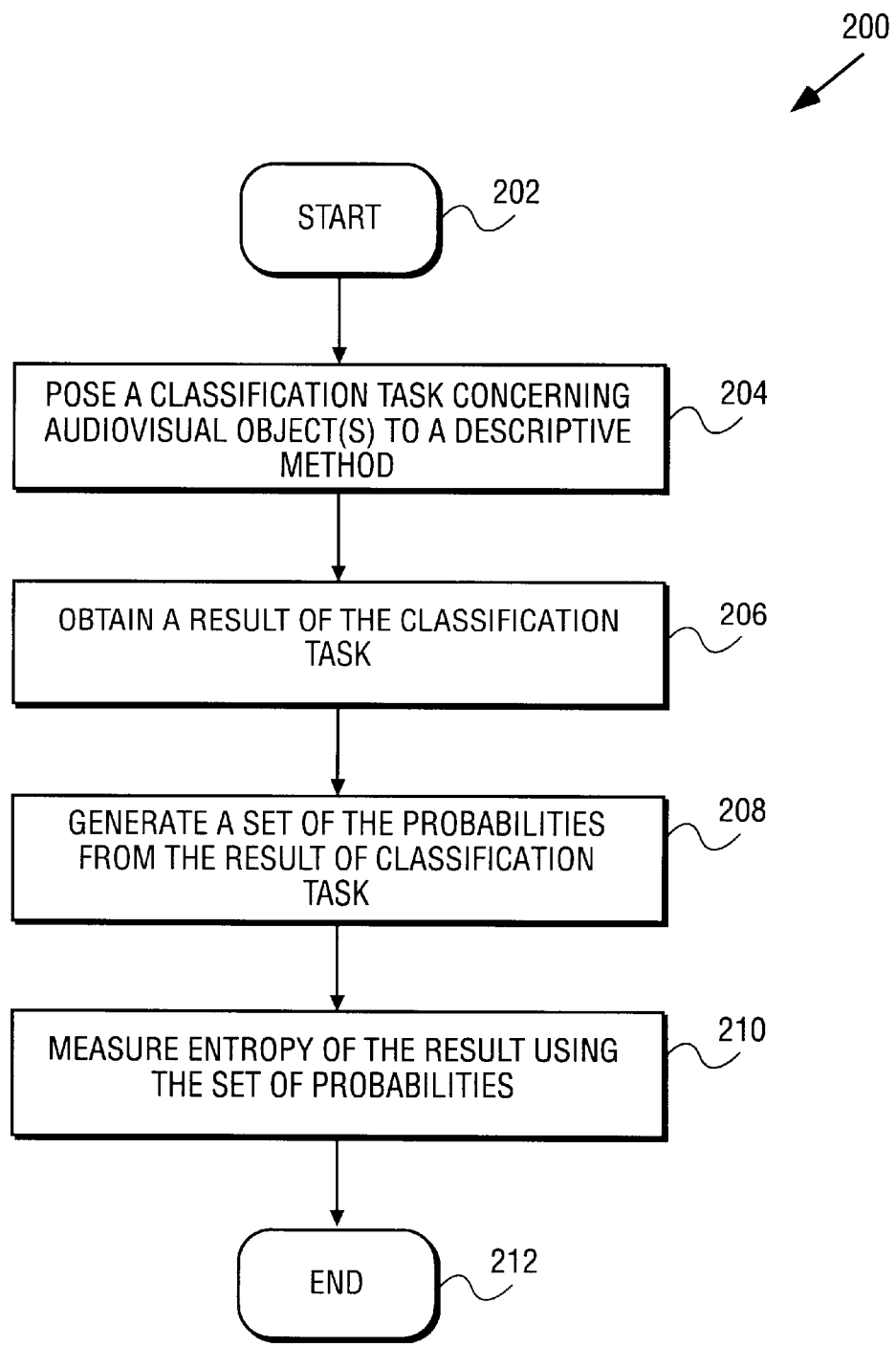
FIG. 2 illustrates a flow diagram of a method for determining quality of a description, according to one embodiment of the present invention.

FIG. 2 illustrates a flow diagram of method 200 for determining quality of a description, according to one embodiment of the present invention. Method 200 begins with posing a classification task to a descriptive method that is used to create a description being evaluated (processing block 204). The classification task requires the descriptive method to classify one or more audiovisual objects. In one embodiment, the classification task identifies a set of classes and requires the descriptive method to classify how well an audiovisual object fits into each of these classes.

Alternatively, the classification task may require the descriptive method to classify a plurality of audiovisual objects into a number of classes.

Next, the classification result produced by the descriptive method is obtained (processing block 206). In one embodiment, the classification result includes a set of percentages indicating how well the object being classified fits into identified classes. Alternatively, the classification result indicates how many audiovisual objects are associated with each class.

Further, a set of probabilities is generated from the classification result (processing block 208). In one embodiment, several classification tasks are performed by the descriptive method to create a set of average probabilities. Afterwards, the entropy of the result is measured using the set of probabilities. The entropy used is Shannon entropy. In one embodiment, the entropy is normalized so that it varies between zero and one, as expressed below $$H = \frac{1}{\log[I]} \sum_{i \in I} -p_i \log p_i.$$

In this expression, $p_i$ is the probability associated with class i, and I represents the number of classes.

The entropy measures the amount of ambiguity in the classification result. For instance, if a descriptive method classifies an audiovisual object in equal percentages to each class, then the descriptive method does not extract any information from the object relevant to performing the given classification task. On the other hand, if the descriptive method classifies the audiovisual object into a single class, then the entropy is equal to zero, and the classification problem is resolved. In one embodiment, threshold entropy values are used to evaluate the quality of a description.

In one embodiment, the entropy may be adjusted according to the intended purpose of descriptions created by a descriptive method. For example, the descriptive method may be used to create descriptors that measure texture, but the classification task posed to the descriptive method may pertain to color Modrians. Then, even if classification task is solved completely, the entropy measure is not indicative of descriptors' ambiguity because the texture descriptors are intended to have nothing to do with color. In this case, following the minimax principle used in optimization, the entropy measure is maximized when measuring the quality of these descriptors.

In one embodiment, entropy measurements may be used when evaluating descriptions based on metric data (e.g., a similarity metric, $L^2$ metric, or similar statistics such as peak signal-to-noise ratio (PSNR)). In this embodiment, entropy may be measured to define a discrimination power of a description. The discrimination power refers to the ability of a descriptive method to classify two audiovisual objects that are similar to each other. That is, when the similarity between the two audiovisual objects is expressed as a distance and an acceptable entropy value must be below a certain threshold, entropy measurements are used to establish what is the minimum distance between the two images that can still allow the descriptive method to properly perform the classification task.

In one embodiment, entropy measurements may be used to construct a measure similar to orthogonality in spatial databases that do not have orthogonal structure. The orthogonality measure provides geometrical representation of dependencies between data items. That is, two data item are orthogonal if they are completely independent from each other (i.e., they do not overlap in any way). In one embodiment, entropy measurements may be used to create descriptions which have mutually no overlap in the entropy domain by requiring that one description have maximum entropy when the other description has minimum entropy and vice-versa. In one embodiment, the above approach may be used to perform a "Gramm-Schmidt" orthogonalization procedure on descriptions with adaptable parameters.

Figure 3:
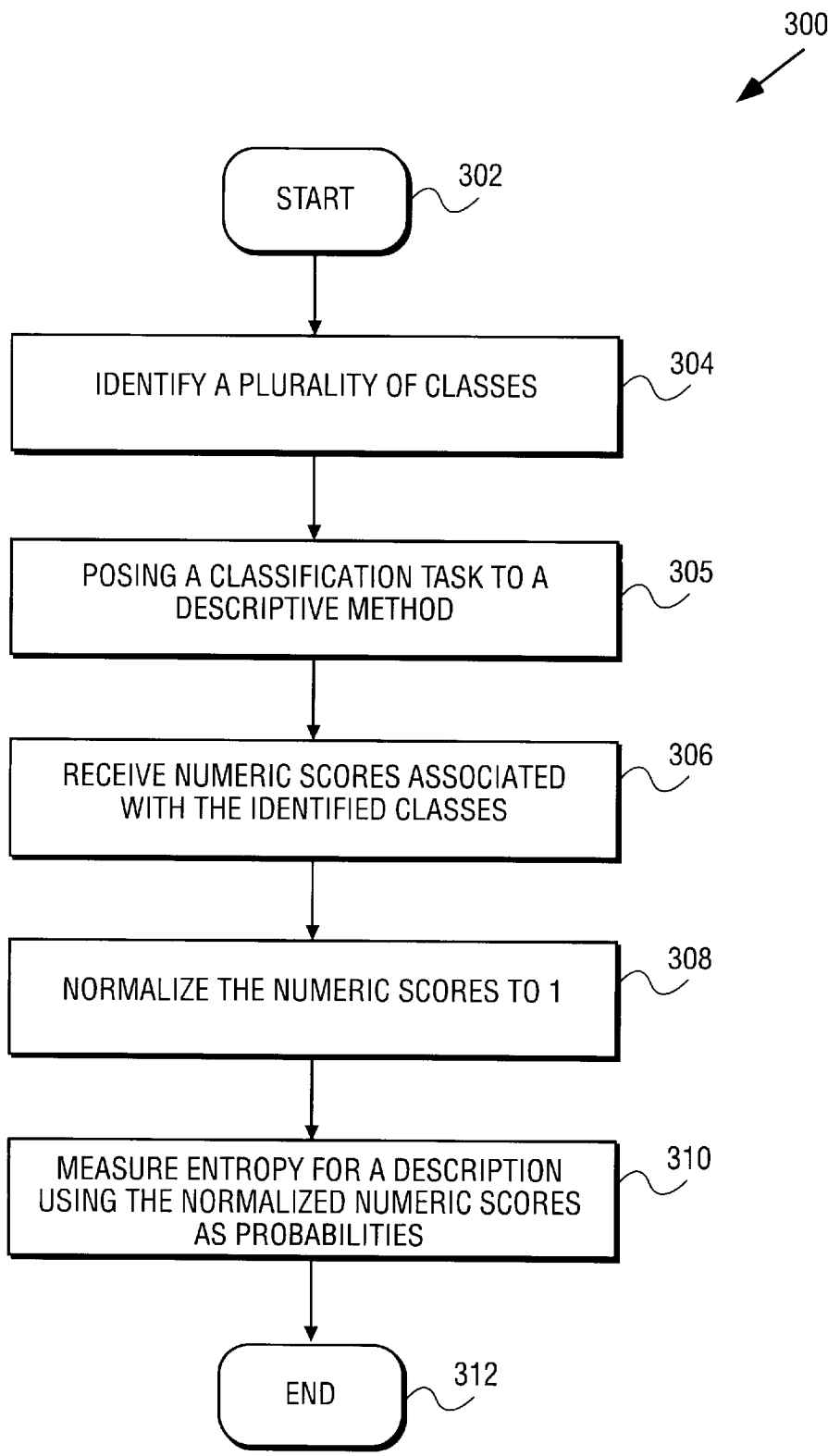
FIG. 3 is a flow diagram of one embodiment of a method for measuring entropy of a classification result.
Figure 4:
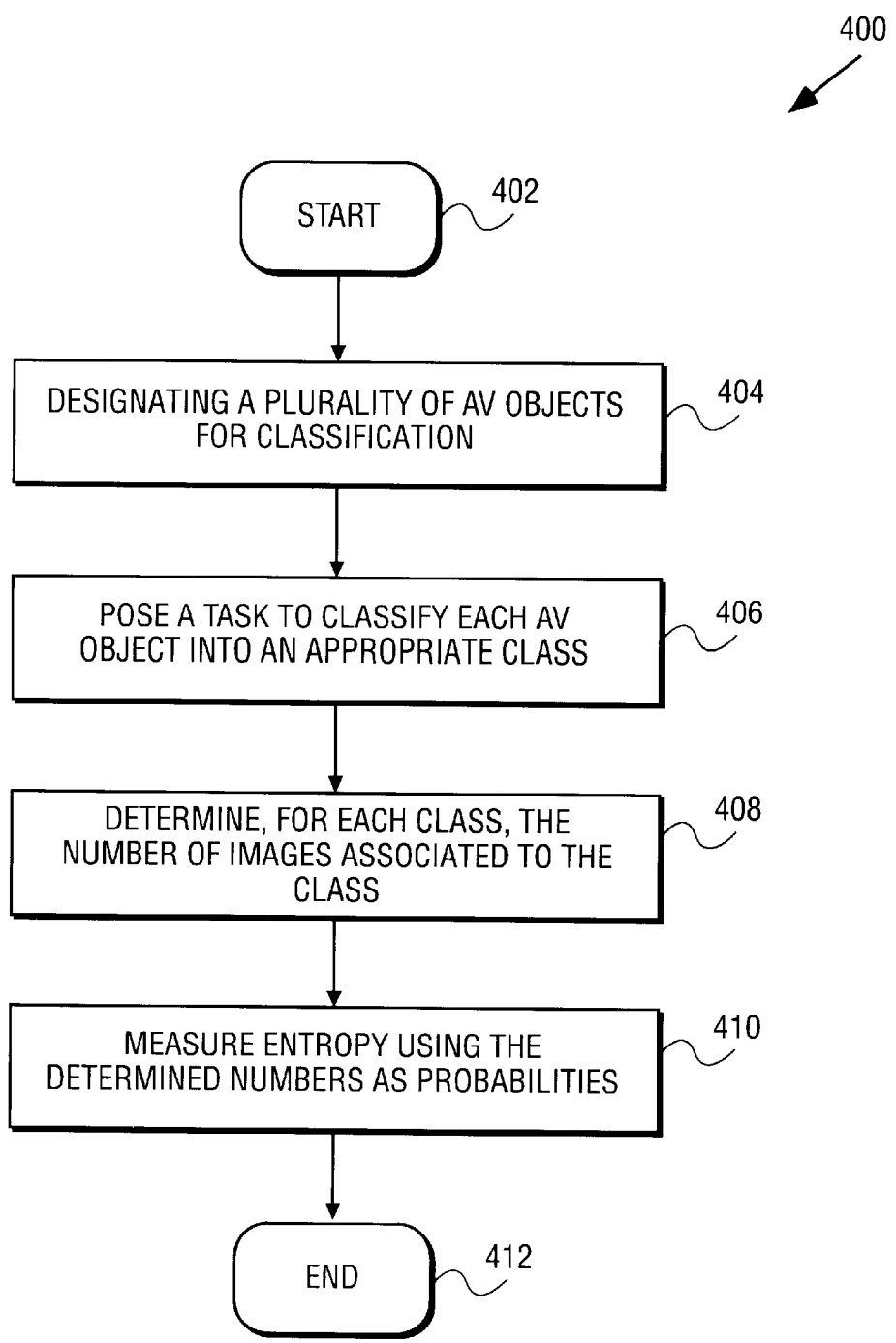
FIG. 4 is a flow diagram of another embodiment of a method for measuring entropy of a classification result.

Various classification tasks may be posed to a descriptive method to evaluate quality of descriptions created by the descriptive method. In one embodiment, the selection of a classification task depends on functionality of a descriptive method being tested. For instance, different descriptive methods may be able to perform classification tasks of different complexity. FIGS. 3 and 4 are flow diagrams of two embodiments of methods for measuring entropy using different classification tasks.

Referring to FIG. 3, method 300 begins with identifying a plurality of classes (processing block 304). At processing block 305, a classification task is posed to a descriptive method which is used to produce a description being evaluated. In one embodiment, the classification task requires the descriptive method to classify an audiovisual object described by the description. That is, the descriptive method is required to determine how well the audiovisual object fits each of the identified classes.

At processing block 306, numeric scores generated by the descriptive method are received. Each of the numeric scores indicates how well the audiovisual object fits a corresponding class, according to the classification performed by the descriptive method. Next, the sum of the numeric scores is normalized to 1 (processing block 308), and then the entropy is calculated using the normalized numeric scores as probabilities (processing block 310). The calculated entropy is indicative of the quality of the description being evaluated.

FIG. 4 is a flow diagram of another embodiment of method 400 for measuring entropy. Method 400 begins with designating multiple audiovisual objects for classification (processing block 404). Next, a task to classify each of these audiovisual objects is posed to a descriptive method which is used to create a description being evaluated (processing block 406). The classification task requests the descriptive method to determine the most closely related class for every audiovisual object.

Further, the number of audiovisual objects associated to every class is counted (processing block 408), and these numbers are used as probabilities in measuring the entropy of the classification result (processing block 410). The measured entropy defines ambiguousness, indicating the degree to which descriptions created using the descriptive method are capable of describing audiovisual content.

In one embodiment, the quality of a description is evaluated by performing a subjective classification and a classification by a computer- implemented descriptive method (e.g., descriptive methods described above in conjunction with FIGS. 2–4). The subjective classification is performed by a large number of persons who classifies a set of audiovisual objects. In one embodiment, the subjective classification is performed using predesignated classes, i.e., the participating people are requested to associate each audiovisual object to one of predesignated classes. Alternatively, the participating people are not provided with predesignated classes. Instead, they have to designate an appropriate class for each audiovisual object being tested.

Once the participating people perform the classification task, an entropy is calculated to determine how ambiguous the classification result is. Then, this classification task pertaining to the same set of audiovisual objects is posed to a descriptive method (i.e., computer-implemented method), and an entropy is measured for a computer-generated classification result. Afterwards, the above entropy values are compared to evaluate the quality of descriptions created using the computer-implemented method.

In one embodiment, once the subjective classification is performed using predesignated classes, any audiovisual object, whose classification is ambiguous beyond a certain threshold, is eliminated. The remaining audiovisual objects are then tested to determine how well a computer-implemented descriptive method can duplicate the human classification.

As discussed above, a description may be in the form of a descriptor or a description scheme. When evaluating a descriptor, a classification test (e.g., an appropriate classification test from the tests described above) may be used to determine the quality of the descriptor. When evaluating a description scheme, two evaluations can be made: global evaluation of the description scheme, or/and evaluation of the internal structure of the description scheme. For the global evaluation, an appropriate classification test (e.g., one of the classification tests described above) may be used to determine the quality of the description scheme taken as a whole. When evaluating the internal structure of the description scheme, two techniques are used depending on whether the "attributes" of the description scheme can be considered ordered or not. An attribute of the description scheme is either a descriptor or another description scheme. The attributes of the description scheme are considered ordered if the description scheme describes an audiovisual object according to a known sequence for describing features of the audiovisual object. For example, the sequence may specify that in order to describe the object, first feature "x" must be described by description scheme L, then feature "y" must be described by descriptor I, then feature "z" must be described by descriptor K, etc.

Figure 5:
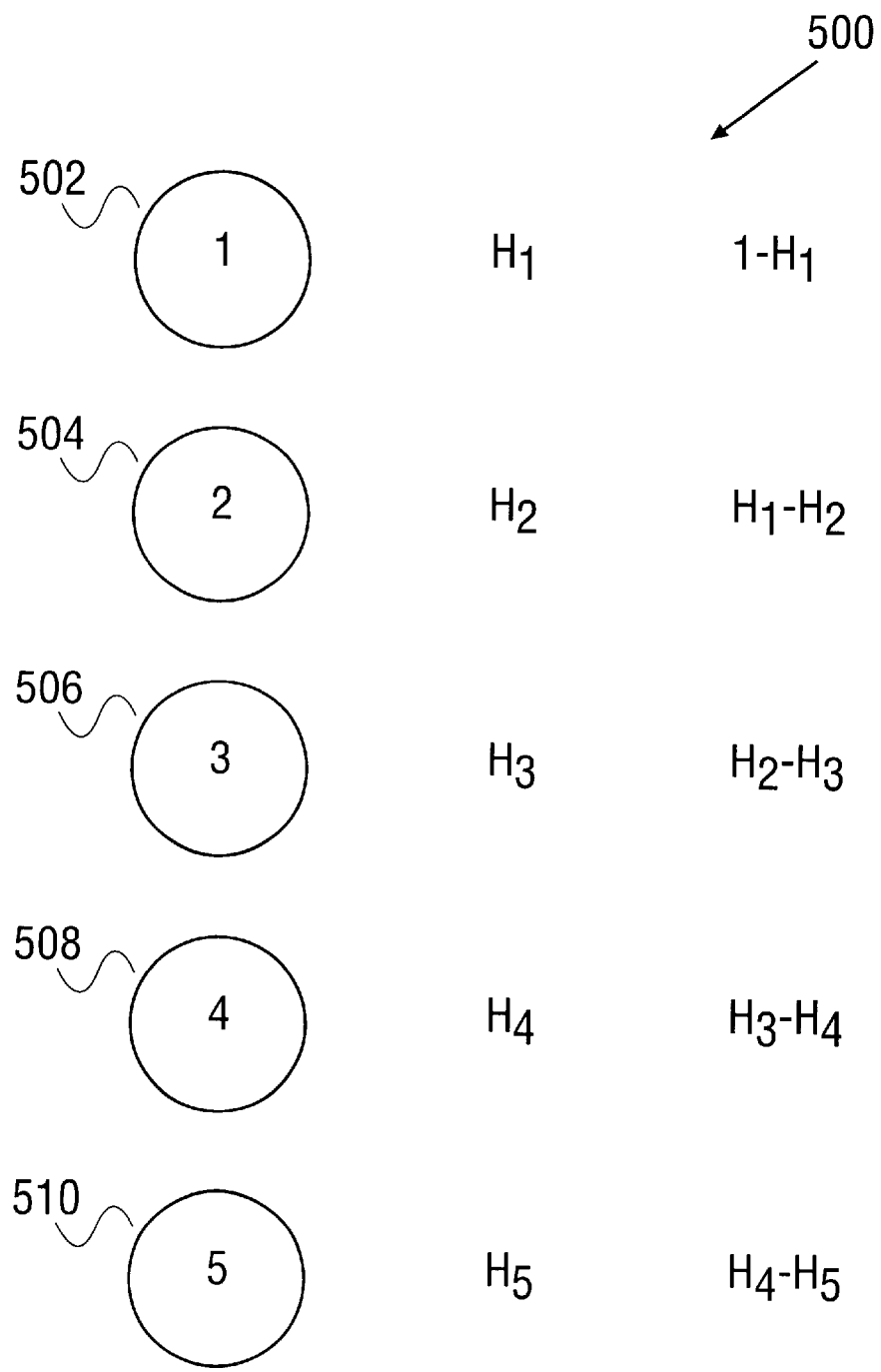
FIG. 5 illustrates evaluation of an internal structure of a description scheme, according to one embodiment of the present invention.

In one embodiment, when attributes of a description scheme are considered ordered, a decision tree is built based on this ordering, with each level of nodes being ascribed to a particular attribute. Then, an entropy is calculated at each node with the probabilities being the probabilities of descending by each of the branches from that node. Based on the calculated entropy values, the internal structure of the description scheme is evaluated. FIG. 5 illustrates the evaluation process of an internal structure of a description scheme, according to one embodiment of the present invention.

Referring to FIG. 5, attributes 502–510 are shown in the order from 1 to 5. Each attribute is shown with an entropy value calculated for this attribute (i.e., $H_1$–$H_5$). Then, at level 1, entropy $H_1$ is compared with the largest possible entropy value of 1. If $H_1$ is equal to 1, this means that attribute 502 performs no descriptive function and can be eliminated. At level 2, entropy $H_2$ is compared to the entropy of the higher level, i.e., entropy $H_1$. Again, if $H_2$ is not less than $H_1$, this means that attribute 504 performs no descriptive function and can be eliminated. The same analysis is performed for each lower level of the description scheme, ending with the last attribute. As a result, only those attributes of the description scheme that are functional are left, and the internal structure of the description scheme is improved.

In another embodiment, when attributes of a description scheme are unordered, entropy is calculated for each level as described above. Then, an attribute is chosen for each level. In one embodiment, the selection of attributes is based on ID3 algorithm proposed by Quinlan in "Learning Efficient Classification Procedures and Their Application to Chess End-Games," Machine Learning, R. S. Michalski et al. eds, Tioga, Palo 1983, cited in Yoh-Han Pao, "Adaptive Pattern Recognition and Neural Networks," Reading, Mass., Addison-Wesley, 1989. Using this algorithm, at each level, the attribute which minimizes the entropy is selected among the remaining attributes. That is, the attribute with the smallest entropy value is selected as attribute 1, then the attribute with the next smallest entropy value is selected as attribute 2, etc. As a result, an optimal ordering for the attributes is determined. In one embodiment, when selecting the order of the attributes, orthogonality of the attributes may be requested as described above.

Accordingly, the use of entropy measurements enables evaluation and machine optimization of description schemes, provides the orthogonal structure for descriptions in spatial database models, and supports universal quality measure that can be used for any kind of descriptions. Furthermore, the entropy measurements can be made on categorical data and are compliant with human perceptual similarities.

Figure 6:
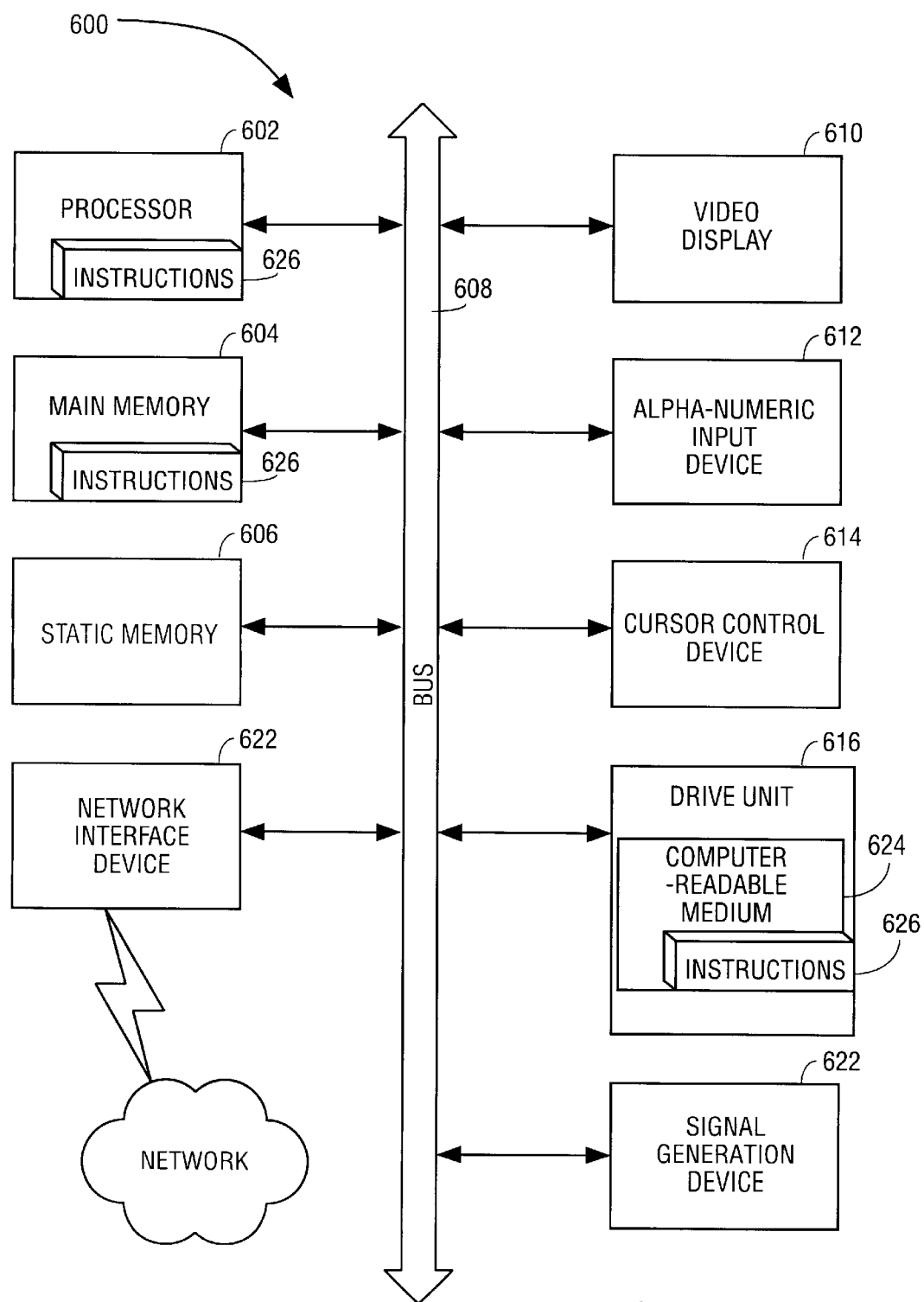
FIG. 6 is a block diagram of one embodiment of a computer system.

FIG. 6 shows a diagrammatic representation of machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 304 and a static memory 606, which communicate with each other via a bus 608. The computer system 600 may further include a video display unit 610 (e.g., a liquid crystal display (LCD) or a cathode ray tube (CRT)).

The computer system 600 also includes an alpha-numeric input device 612 (e.g., a keyboard), a cursor control device 614 (e.g., a mouse), a disk drive unit 616, a signal generation device 620 (e.g., a speaker) and a network interface device 622.

The disk drive unit 616 includes a computer-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 622. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for determining quality of a description have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computerized method for execution by a computer system for determining quality of a description, the method comprising:

identifying a plurality of classes;

posing a classification task concerning at least one audiovisual object to a descriptive method that is used to create the description;

receiving numeric scores associated with the plurality of classes;

normalizing the numeric scores;

generating a set of probabilities from the normalized numeric scores; and calculating an entropy of the result using the set of probabilities.

2. The method of claim 1 further comprising comparing the measured entropy with an entropy resulting from a classification task performed by a plurality of persons.

3. The method of claim 1 wherein each of the numeric scores indicates how well an audiovisual object fits a corresponding class.

4. The method of claim 1 wherein:

the at least one audiovisual object represents a plurality of objects; and receiving numeric scores further comprises determining, for each of the plurality of classes, a number of audiovisual objects associated with said each class.

5. The method of claim 1 further comprising:

measuring an entropy resulting from classifying two audiovisual objects by the descriptive method, the two audiovisual objects being characterized by metric data; and determining a discrimination power of the description using the measured entropy.

6. The method of claim 1 further comprising providing orthogonality for a plurality of descriptions in a spatial database using entropy measurements.

7. The method of claim 1 wherein:

the description is a descriptor; and the method further comprises utilizing the measured entropy to compare quality of said descriptor with quality of a descriptor of a different kind.

8. The method of claim 1 wherein the description is a description scheme and the measured entropy is utilized to globally evaluate the quality of the description scheme.

9. The method of claim 1 wherein the description is an attribute of a description scheme and the method of claim 1 further comprises:

measuring entropy for each attribute of the description scheme; and evaluating an internal structure of the description scheme using the entropy measured for each attribute.

10. The method of claim 9 further comprising optimizing the description scheme based on the evaluation of the internal structure.

11. A computerized system for determining quality of a description, the system comprising:

means for identifying a plurality of classes;

means for posing a classification task concerning at least one audiovisual object to a descriptive method that is used to create the description;

means for receiving numeric scores associated with the plurality of classes;

means for normalizing the numeric scores;

means for generating a set of probabilities from the normalized numeric scores; and means for calculating an entropy of the result using the set of probabilities.

12. A computer readable medium comprising instructions, which when executed on a processor, perform a method for determining quality of a description, the method comprising:

identifying a plurality of classes;

posing a classification task concerning at least one audiovisual object to a descriptive method that is used to create the description;

receiving numeric scores associated with the plurality of classes;

normalizing the numeric scores;

generating a set of probabilities from the normalized numeric scores; and calculating an entropy of the result using the set of probabilities.

13. An apparatus for determining quality of a description, the apparatus comprising:

at least one processor; and a memory coupled to the at least one processor, the memory storing a classification query module for posing a classification task concerning at least one audiovisual object to a descriptive method that is used to create the description, and an entropy calculator for receiving numeric scores associated with a plurality of classes, normalizing the numeric scores, generating a set of probabilities from the normalized numeric scores, and calculating an entropy of the result using the set of probabilities.

14. The apparatus of claim 13 wherein each of the numeric scores indicates how well an audiovisual object fits a corresponding class.

15. The apparatus of claim 13 wherein the at least one audiovisual object represents a plurality of objects and the entropy calculator is configured to determine, for each of the plurality of classes, a number of audiovisual objects associated with said each class.

16. The apparatus of claim 13 wherein the entropy calculator is configured to measure an entropy resulting from classifying two audiovisual objects by the descriptive method, the two audiovisual objects being characterized by metric data, and to determine a discrimination power of the description using the measured entropy.

17. The apparatus of claim 13 wherein the description is a description scheme and the measured entropy is utilized to globally evaluate the quality of the description scheme.

18. The apparatus of claim 13 wherein the description is an attribute of a description scheme and the entropy calculator is configured to measure entropy for each attribute of the description scheme, and to evaluate an internal structure of the description scheme using the entropy measured for each attribute.

* * * * *